(12) United States Patent
Miles et al.

(10) Patent No.: US 10,718,686 B2
(45) Date of Patent: Jul. 21, 2020

(54) TEST PROCEDURE FOR DETERMINING STEERING INTERMEDIATE SHAFT RATTLE

(71) Applicant: GM GLOBAL TECHNOLOGY OPERATIONS LLC, Detroit, MI (US)

(72) Inventors: Brent P. Miles, Milford, MI (US); Hunter D. Poole, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 16/173,422

(22) Filed: Oct. 29, 2018

(65) Prior Publication Data

US 2020/0132568 A1    Apr. 30, 2020

(51) Int. Cl.
*G01M 7/02* (2006.01)
*G01M 17/06* (2006.01)

(52) U.S. Cl.
CPC ............ *G01M 7/027* (2013.01); *G01M 17/06* (2013.01)

(58) Field of Classification Search
CPC .............................. G01M 7/027; G01M 17/06
USPC ...................................................... 73/862.24
See application file for complete search history.

(56) References Cited

U.S. PATENT DOCUMENTS

| | | | |
|---|---|---|---|
| 6,550,568 B2 * | 4/2003 | Ross | B62D 5/0409 180/444 |
| 7,742,899 B2 | 6/2010 | Lemont, Jr. et al. | |
| 9,452,776 B1 * | 9/2016 | Hwa | B62D 5/0457 |
| 9,599,535 B2 * | 3/2017 | Adams | G01M 13/028 |

* cited by examiner

*Primary Examiner* — Octavia Hollington
(74) *Attorney, Agent, or Firm* — Quinn IP Law

(57) ABSTRACT

An exemplary method for determining rattle noise of a vehicle steering system includes providing an intermediate shaft assembly including a first shaft member coupled to a second shaft member by a first joining member, a third shaft member coupled to the second shaft member by a second joining member, the first shaft member coupled to a first motor and the third shaft coupled to a second motor, providing a first sensor coupled to the first joining member and a second sensor coupled to the second joining member, sensors configured to measure an acceleration of the first joining member and the second joining member, applying a first torque and a second torque to the intermediate shaft assembly, receiving first acceleration data from the first sensor and second acceleration data from the second sensor, and analyzing the first and second acceleration data to determine a rattle noise of the intermediate shaft assembly.

16 Claims, 1 Drawing Sheet

TEST PROCEDURE FOR DETERMINING STEERING INTERMEDIATE SHAFT RATTLE

INTRODUCTION

The present invention relates generally to the field of vehicles and, more specifically, to undesirable rattle that sometimes occurs in vehicle steering systems, and more particularly to a test procedure to determine a propensity for steering intermediate shaft rattle in a vehicle from a lab test.

An intermediate steering shaft indirectly connects the steering gearbox and the steering wheel of a vehicle. In some embodiments, a universal joint on one end of the intermediate steering shaft connects to the steering gearbox and another universal joint at the opposite end of the intermediate steering shaft connects to the steering column which connects to the steering wheel. When the intermediate steering shaft degrades or is poorly assembled, noise, such as a rattle, is generated, which can be heard by vehicle occupants.

Typically, intermediate steering shaft rattle tests are performed on a vehicle, making repeatability very difficult. Moreover, since these tests are done on a vehicle level test, other components of the vehicle can make noise during the test that make it more difficult to correctly determine the noise levels of the steering system separate from these other noises.

SUMMARY

Embodiments according to the present disclosure provide a number of advantages. For example, embodiments according to the present disclosure enable repeatable and focused analysis of an intermediate shaft of a vehicle steering system to determine rattle propensity.

In one aspect, a method for determining rattle noise of a vehicle steering system includes providing an intermediate shaft assembly including a first shaft member coupled to a second shaft member by a first joining member, a third shaft member coupled to the second shaft member by a second joining member, the first shaft member coupled to a first motor and the third shaft coupled to a second motor, providing a first sensor coupled to the first joining member and a second sensor coupled to the second joining member, the first sensor configured to measure an acceleration of the first joining member and the second sensor configured to measure an acceleration of the second joining member, providing a controller electrically connected to the first and second sensors and the first and second motors, generating, by the controller, a first control signal transmitted to the first motor, generating, by the controller, a second control signal transmitted to the second motor, applying, via the first motor, a first torque to the intermediate shaft assembly, applying, via the second motor, a second torque to the intermediate shaft assembly, receiving, by the controller, first acceleration data from the first sensor and second acceleration data from the second sensor, and analyzing, by the controller, the first and second acceleration data to determine a rattle noise of the intermediate shaft assembly.

In some aspects, the first torque is a predetermined torque rattle profile.

In some aspects, the second torque is a reaction torque to the first torque such that the second motor allows a predetermined deflection of the intermediate shaft assembly from a zero (0) degree center position to simulate an operator's response to the first torque.

In some aspects, the first acceleration data is indicative of an acceleration response of the first joining member to the applied first and second torques.

In some aspects, the second acceleration data is indicative of an acceleration response of the second joining member to the applied first and second torques.

In some aspects, the first and second acceleration data indicates acceleration of the first and second joining members on an axis perpendicular to the intermediate shaft assembly.

In some aspects, the first and second acceleration data received by the controller is proportional to a level of audible noise generated by the intermediate shaft assembly in response to the applied first and second torques.

In some aspects, analyzing the first and second acceleration data to determine a rattle noise of the intermediate shaft assembly further includes receiving, by the controller, first motor torque data from the first motor and second motor torque data from the second motor, processing, by the controller, the first and second motor torque data to generate a net torque signal, generating, by the controller, an apply rate wave from the net torque signal, determining, by the controller, a plurality of peak acceleration value from each peak of the apply rate wave, generating, by the controller, a best fit line based on the plurality of peak acceleration values, applying, by the controller, a predefined apply rate to the best fit line to determine a rattle acceleration value, and comparing, by the controller, the rattle acceleration value to a rattle index level.

In another aspect, a method for determining rattle noise of a vehicle steering system includes providing an intermediate shaft assembly including a first shaft member coupled to a second shaft member by a first joining member, a third shaft member coupled to the second shaft member by a second joining member, the first shaft member coupled to a first motor and the third shaft coupled to a second motor, providing a first sensor coupled to the first joining member and a second sensor coupled to the second joining member, the first sensor configured to measure an acceleration of the first joining member and the second sensor configured to measure an acceleration of the second joining member, providing a controller electrically connected to the first and second sensors and the first and second motors, generating, by the controller, a first control signal transmitted to the first motor, generating, by the controller, a second control signal transmitted to the second motor, applying, via the first motor, a first torque and a second torque to the intermediate shaft assembly, receiving, by the controller, first acceleration data from the first sensor and second acceleration data from the second sensor, receiving, by the controller, first motor torque data from the first motor and second motor torque data from the second motor, generating, by the controller, a net torque signal from the first and second motor torque data and generating an apply rate wave from the net torque signal, determining, by the controller, a plurality of peak acceleration value from each peak of the apply rate wave and fitting a line to the plurality of peak acceleration values, determining, by the controller, a rattle acceleration value from the fitted line, and analyzing, by the controller, the rattle acceleration value to determine a rattle noise of the intermediate shaft assembly.

In some aspects, analyzing the rattle acceleration value to determine a rattle noise of the intermediate shaft assembly includes comparing, by the controller, the rattle acceleration value to a rattle index level.

In some aspects, the first torque is a predetermined torque rattle profile.

In some aspects, the second torque is a reaction torque to the first torque such that the second motor allows a predetermined deflection of the intermediate shaft assembly from a zero (0) degree center position to simulate an operator's response to the first torque.

In some aspects, the first acceleration data is indicative of an acceleration response of the first joining member to the applied first and second torques.

In some aspects, the second acceleration data is indicative of an acceleration response of the second joining member to the applied first and second torques.

In some aspects, the first and second acceleration data received by the controller is proportional to a level of audible noise generated by the intermediate shaft assembly in response to the applied first and second torques.

In yet another aspect, a system for determining rattle noise of a vehicle steering system includes an intermediate shaft assembly including a first shaft member coupled to a second shaft member by a first joining member, a third shaft member coupled to the second shaft member by a second joining member, the first shaft member coupled to a first motor and the third shaft coupled to a second motor, a first sensor coupled to the first joining member and a second sensor coupled to the second joining member, the first sensor configured to measure an acceleration of the first joining member and the second sensor configured to measure an acceleration of the second joining member, and a controller electrically connected to the first and second sensors and the first and second motors, the controller configured to generate a first control signal transmitted to the first motor, the first control signal controlling the first motor to apply a first torque to the intermediate shaft assembly, generate a second control signal transmitted to the second motor, the second control signal controlling the second motor to apply a second torque to the intermediate shaft assembly, receive first acceleration data from the first sensor and second acceleration data from the second sensor, and analyze the first and second acceleration data to determine a rattle noise of the intermediate shaft assembly.

BRIEF DESCRIPTION OF THE DRAWINGS

The present disclosure will be described in conjunction with the following figures, wherein like numerals denote like elements.

Figure 1:
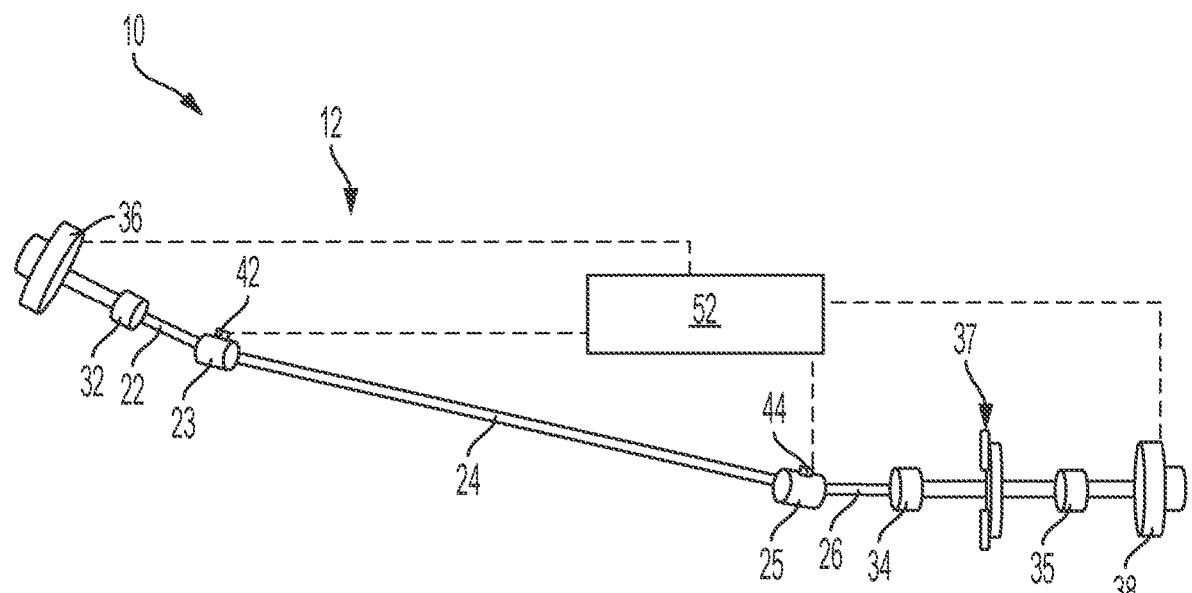
FIG. 1 is a schematic illustration of a portion of a vehicle steering assembly and a measurement apparatus.

The foregoing and other features of the present disclosure will become more fully apparent from the foil owing description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "hack," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

With reference to FIG. 1, a steering assembly 10 for a vehicle is generally illustrated. The steering assembly 10 includes an intermediate shaft (I-shaft) assembly 12. The I-shaft assembly 12 includes a first shaft member 22, a second shaft member 24, and a third shaft member 26. The first and second shaft members 22, 24 are coupled by a first joining member 23. Similarly, the second and third shaft members 24, 26 are coupled by a second joining member 25. In some embodiments, each of the first and second joining members 23, 25 is a universal joint.

In some embodiments, the first shaft 22 is coupled to a gear-side yoke coupler 32. The gear-side yoke coupler 32 is coupled to a first motor 36. Similarly, the third shaft 26 is coupled to a column-side yoke coupler and inertia wheel assembly. The column-side yoke coupler and inertia wheel assembly includes a first column-side yoke coupler 34, an inertia wheel 37, and a second column-side yoke coupler 35. The second column-side yoke coupler 35 is coupled to a second motor 38. Each of the first and second motors 36, 38 includes a torque sensor and a position sensor.

A first sensor 42 is coupled to the first joining member 23. Similarly, a second sensor 44 is coupled to the second joining member 25. In some embodiments, each of the first and second sensors is an accelerometer. In some embodiments, each of the first and second sensors 42, 44 is adhesively connected to the respective joining member, with the measuring axis of each sensor 42, 44 perpendicular to the I-shaft assembly 12.

Each of the first and second sensors 42, 44 is in communication with a controller 52 such that each of the first and second sensors 42, 44 can receive a control signal from the controller 52 and transmit first and second sensor data to the controller 52 for analysis and processing. Additionally, each of the first and second motors 36, 38 is in communication with the controller 52 such that each of the first and second motors 36, 38 can receive a control signal from the controller 52 and transmit first and second motor torque data to the controller 52 for analysis and processing.

The controller 52 may be in communication with a display (not shown) or other sensors (not shown) coupled to the I-shaft assembly 12. In some embodiments, the controller 52 is a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions.

The components discussed above may be essentially conventional, if so desired, and so will not be discussed further herein. The steering assembly 10 shown in FIG. 1, including the I-shaft assembly 12, may be mounted in a lab test setup, depending upon the data to be collected and the tests to be run.

Figure 2:
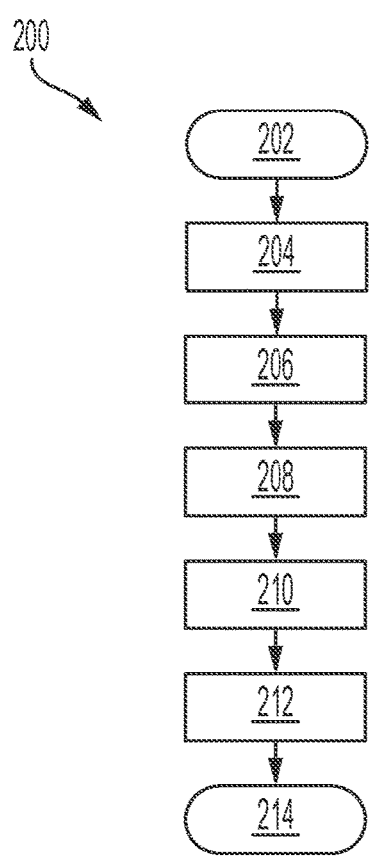
FIG. 2 is a flow chart illustrating a method for performing a rattle test on an intermediate shaft.

FIG. 2 illustrates a method 200 to measure rattle noise in a steering system, specifically an I-shaft assembly of a steering system. The method 200 can be utilized in connection with the I-shaft assembly 12 discussed relative to FIG. 1. The method 200 can be utilized in connection with the controller 52 as discussed herein, or by other systems associated with or separate from the I-shaft assembly 12, in accordance with exemplary embodiments. The order of operation of the method 200 is not limited to the sequential execution as illustrated in FIG. 2, but may be performed in one or more varying orders, or steps may be performed simultaneously, as applicable in accordance with the present disclosure.

The method 200 begins at 202 and proceeds to 204, at which the I-shaft assembly 12 is configured for the test procedure. In some embodiments of the test procedure, the I-shaft assembly 12 is oriented such that the first, second, and third shaft members 22, 24, 26 are coplanar, that is the I-shaft assembly 12 is configured into vehicle coplanar joint angles. In other embodiments, the I-shaft assembly 12 is configured into one or more rotation angles for performance of the following steps of the method 200.

Next, at 206, the first motor 36 is commanded, via a first control signal generated by the controller 52, to apply a first torque to the I-shaft assembly 12. The applied first torque simulates a reaction to a road event that may cause steering rattle, such as a rough road, bump, etc., for example and without limitation. The applied first torque is a predetermined torque rattle profile and is applied to the lower half of the I-shaft assembly 12 via the gear coupler 32 and the first shaft member 22. In some embodiments, the applied torque is applied to the lower half of the I-shaft assembly 12 at various apply rates to a common peak value.

At 206, the second motor 38 is commanded, via a second control signal generated by the controller 52, to apply a second torque to the other, opposite end of the I-shaft assembly 12, that is, to the third shaft member 26 via the gear coupler 34. The second torque simulates an operator's reaction to the applied first torque. That is, the second torque simulates the operator holding the steering wheel of the vehicle in a centered and steady position. The second motor 38 is, in some embodiments, a driver simulator motor that is tuned to allow for some deviation from a holding position to simulate an operator holding the steering wheel. In some embodiments, the second motor 38 holds the I-shaft assembly 12 in a relative zero-degree center position and is tuned to allow a predetermined amount of deflection from the zero-degree center position to simulate an operator holding a steering wheel in a neutral and centered position. In some embodiments, the second motor 38 will "snap back" to the zero-degree center position in response to the applied first torque from the first motor 36.

Next, at 208, the controller 52 receives sensor data from the first and second sensors 42, 44. The sensor data includes first acceleration data from the first sensor 42 and second acceleration data from the second sensor 44. The first acceleration data is indicative of an acceleration response of the first joining member 23. The second acceleration data is indicative of an acceleration response of the second joining member 25. In some embodiments, the first and second acceleration data indicates acceleration of the joining members 23, 25 on a single axis perpendicular to the I-shaft. In other embodiments, acceleration along one, two, or three axes is measured by the sensors 42, 44.

The first and second acceleration data received and recorded by the controller 52 at 208 is proportional to the level of audible noise generated by the I-shaft assembly 12 in response to the applied first and second torques. In some embodiments, the first and second acceleration data is measured by the first and second sensors 42, 44 as the predetermined forces are applied multiple times. The number of times the first and second torques are applied may be, for example, five or more times although the applied torques may be applied any predetermined number of times if desired.

At 208, the controller 52 also receives first motor torque data from the first motor 36 and second motor torque data from the second motor 38.

Next, at 210, the controller 52 performs analysis of the first and second acceleration data and the first and second motor torque data to determine a rattle or noise profile of the I-shaft assembly 12. In some embodiments, the first and second acceleration data and the first and second motor torque data are passed through a low-pass filter and resampled.

After filtering the first and second acceleration data and the first and second motor torque data, the controller 52 performs additional post-processing by combining the motor torque data from both motors 36, 38 to generate a single net torque channel. The controller 52 takes the derivative of this torque channel to determine an apply rate of the torque at each data point and generates an apply rate wave. In further analysis, the controller 52 determines the peaks of the apply rate wave. The controller 52 determines the peak acceleration value at each peak of the apply rate wave and then plots the acceleration value with respect to each value's corresponding peak apply rate.

In one nonlimiting embodiment, fourteen (14) torque waves are applied, generating fourteen (14) plotted peak acceleration values (seven (7) positive apply rates and seven (7) negative apply rates). A best fit line is created between the points (in some embodiments, a second order polynomial). A separate best fit line is generated for each of the peak acceleration values determined from the positive apply rates and from the negative apply rates.

Next, at 212, the controller 52 applies a predefined apply rate to determine a rattle evaluation acceleration value from each best fit line. The controller 52 then uses the rattle evaluation acceleration values to determine if rattle is present.

If the rattle evaluation acceleration values are above the acceptable rattle index level, this indicates that the particular assembly 12 may produce undesirable audible rattle events when employed in a vehicle. Thus, some design or assembly change may be needed for this particular design of the assembly 12. If the average is below the acceptable rattle index, then the method may be repeated for other forcing functions that simulate road conditions likely to cause I-shaft rattle, if so desired. When all of the desired different forcing functions have been run through the test and the assembly 12 does not produce any average above an acceptable rattle index level, the test procedure provides an objective indication that the particular assembly 12 will not produce objectionable rattle.

The method 200 then proceeds to 214 and ends.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for determining rattle noise of a vehicle steering system, the method comprising:
    providing an intermediate shaft assembly comprising a first shaft member coupled to a second shaft member by a first joining member, a third shaft member coupled to the second shaft member by a second joining member, the first shaft member coupled to a first motor and the third shaft coupled to a second motor;
    providing a first sensor coupled to the first joining member and a second sensor coupled to the second joining member, the first sensor configured to measure an acceleration of the first joining member and the second sensor configured to measure an acceleration of the second joining member;
    providing a controller electrically connected to the first and second sensors and the first and second motors;
    generating, by the controller, a first control signal transmitted to the first motor;
    generating, by the controller, a second control signal transmitted to the second motor;
    applying, via the first motor, a first torque to the intermediate shaft assembly;
    applying, via the second motor, a second torque to the intermediate shaft assembly;
    receiving, by the controller, first acceleration data from the first sensor and second acceleration data from the second sensor; and
    analyzing, by the controller, the first and second acceleration data to determine a rattle noise of the intermediate shaft assembly.

2. The method of claim 1, wherein the first torque is a predetermined torque rattle profile.

3. The method of claim 2, wherein the second torque is a reaction torque to the first torque such that the second motor allows a predetermined deflection of the intermediate shaft assembly from a zero (0) degree center position to simulate an operator's response to the first torque.

4. The method of claim 1, wherein the first acceleration data is indicative of an acceleration response of the first joining member to the applied first and second torques.

5. The method of claim 1, wherein the second acceleration data is indicative of an acceleration response of the second joining member to the applied first and second torques.

6. The method of claim 1, wherein the first and second acceleration data indicates acceleration of the first and second joining members on an axis perpendicular to the intermediate shaft assembly.

7. The method of claim 1, wherein the first and second acceleration data received by the controller is proportional to a level of audible noise generated by the intermediate shaft assembly in response to the applied first and second torques.

8. The method of claim 1, wherein analyzing the first and second acceleration data to determine a rattle noise of the intermediate shaft assembly further comprises:
    receiving, by the controller, first motor torque data from the first motor and second motor torque data from the second motor;
    processing, by the controller, the first and second motor torque data to generate a net torque signal;
    generating, by the controller, an apply rate wave from the net torque signal;
    determining, by the controller, a plurality of peak acceleration value from each peak of the apply rate wave;
    generating, by the controller, a best fit line based on the plurality of peak acceleration values;
    applying, by the controller, a predefined apply rate to the best fit line to determine a rattle acceleration value; and
    comparing, by the controller, the rattle acceleration value to a rattle index level.

9. A method for determining rattle noise of a vehicle steering system, the method comprising:
    providing an intermediate shaft assembly comprising a first shaft member coupled to a second shaft member by a first joining member, a third shaft member coupled to the second shaft member by a second joining member, the first shaft member coupled to a first motor and the third shaft coupled to a second motor;
    providing a first sensor coupled to the first joining member and a second sensor coupled to the second joining member, the first sensor configured to measure an acceleration of the first joining member and the second sensor configured to measure an acceleration of the second joining member;
    providing a controller electrically connected to the first and second sensors and the first and second motors;
    generating, by the controller, a first control signal transmitted to the first motor;
    generating, by the controller, a second control signal transmitted to the second motor;
    applying, via the first motor, a first torque and a second torque to the intermediate shaft assembly;
    receiving, by the controller, first acceleration data from the first sensor and second acceleration data from the second sensor;
    receiving, by the controller, first motor torque data from the first motor and second motor torque data from the second motor;
    generating, by the controller, a net torque signal from the first and second motor torque data and generating an apply rate wave from the net torque signal;
    determining, by the controller, a plurality of peak acceleration value from each peak of the apply rate wave and fitting a line to the plurality of peak acceleration values;
    determining, by the controller, a rattle acceleration value from the fitted line; and
    analyzing, by the controller, the rattle acceleration value to determine a rattle noise of the intermediate shaft assembly.

10. The method of claim 9, wherein analyzing the rattle acceleration value to determine a rattle noise of the intermediate shaft assembly comprises comparing, by the controller, the rattle acceleration value to a rattle index level.

11. The method of claim 9, wherein the first torque is a predetermined torque rattle profile.

12. The method of claim 9, wherein the second torque is a reaction torque to the first torque such that the second motor allows a predetermined deflection of the intermediate shaft assembly from a zero (0) degree center position to simulate an operator's response to the first torque.

13. The method of claim 9, wherein the first acceleration data is indicative of an acceleration response of the first joining member to the applied first and second torques.

14. The method of claim 9, wherein the second acceleration data is indicative of an acceleration response of the second joining member to the applied first and second torques.

15. The method of claim 9, wherein the first and second acceleration data received by the controller is proportional to a level of audible noise generated by the intermediate shaft assembly in response to the applied first and second torques.

16. A system for determining rattle noise of a vehicle steering system, comprising:
- an intermediate shaft assembly comprising a first shaft member coupled to a second shaft member by a first joining member, a third shaft member coupled to the second shaft member by a second joining member, the first shaft member coupled to a first motor and the third shaft coupled to a second motor;
- a first sensor coupled to the first joining member and a second sensor coupled to the second joining member, the first sensor configured to measure an acceleration of the first joining member and the second sensor configured to measure an acceleration of the second joining member; and
- a controller electrically connected to the first and second sensors and the first and second motors, the controller configured to
    - generate a first control signal transmitted to the first motor, the first control signal controlling the first motor to apply a first torque to the intermediate shaft assembly;
    - generate a second control signal transmitted to the second motor, the second control signal controlling the second motor to apply a second torque to the intermediate shaft assembly;
    - receive first acceleration data from the first sensor and second acceleration data from the second sensor; and
    - analyze the first and second acceleration data to determine a rattle noise of the intermediate shaft assembly.

\* \* \* \* \*